US012798765B2

(12) United States Patent
Chennabasavaiah et al.

(10) Patent No.: US 12,798,765 B2
(45) Date of Patent: Nov. 17, 2026

(54) LANDING GEAR RETRACTION AND EXTENSION LINK MECHANISM WITH GEARBOX AND ELECTRICAL MOTOR

(71) Applicant: Goodrich Corporation, Charlotte, NC (US)

(72) Inventors: Dayananda Alagatta Chennabasavaiah, Bangalore (IN); Madan Cp, Bengaluru (IN); Karthik Narayan, Milton (CA)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 19/188,978

(22) Filed: Apr. 24, 2025

(65) Prior Publication Data

US 2026/0116530 A1 Apr. 30, 2026

(30) Foreign Application Priority Data

Jun. 24, 2024 (IN) ............................ 202441048415

(51) Int. Cl.

| | |
|---|---|
| ***B64C 25/20*** | (2006.01) |
| ***B64C 25/14*** | (2006.01) |
| ***B64C 25/24*** | (2006.01) |
| ***B64C 25/26*** | (2006.01) |
| ***B64C 25/34*** | (2006.01) |
| ***F16H 37/12*** | (2006.01) |

(52) U.S. Cl.

CPC .............. *B64C 25/20* (2013.01); *B64C 25/14* (2013.01); *B64C 25/24* (2013.01); *B64C 25/26* (2013.01); *B64C 25/34* (2013.01); *F16H 37/122* (2013.01)

(58) Field of Classification Search

CPC ... B64C 25/10; B64C 25/12; B64C 2025/125; B64C 25/14; B64C 25/18; B64C 25/20; B64C 25/24

See application file for complete search history.

(56) References Cited

U.S. PATENT DOCUMENTS

| | | | | |
|---|---|---|---|---|
| 2,408,993 | A * | 10/1946 | Nardone | B64C 25/24 192/48.5 |
| 9,056,672 | B2 | 6/2015 | Keller et al. | |
| 2014/0263554 | A1 * | 9/2014 | Leimbach | A61B 17/32 227/176.1 |
| 2020/0354043 | A1 * | 11/2020 | Cottet | B64C 25/18 |

FOREIGN PATENT DOCUMENTS

| | | |
|---|---|---|
| GB | 552266 | 3/1943 |

* cited by examiner

*Primary Examiner* — Ashesh Dangol
(74) *Attorney, Agent, or Firm* — SNELL & WILMER L.L.P.

(57) ABSTRACT

A landing gear actuation system is disclosed herein. The landing gear actuation system includes a motor, a gearbox comprising a gear train, a linkage mechanism, and a trunnion. The gear train is coupled to the motor. The linkage mechanism is coupled to the gear train. The trunnion is coupled to the linkage mechanism. A rotation of the gear train by the motor rotates the linkage mechanism to drive the trunnion to at least one of extend or retract a landing gear.

20 Claims, 4 Drawing Sheets

LANDING GEAR RETRACTION AND EXTENSION LINK MECHANISM WITH GEARBOX AND ELECTRICAL MOTOR

CROSS-REFERENCE TO RELATED APPLICATIONS

This application claims priority to, and the benefit of, India Patent Application No. 202441048415, filed Jun. 24, 2024 (DAS Code 83EA) and titled "LANDING GEAR RETRACTION AND EXTENSION LINK MECHANISM WITH GEARBOX AND ELECTRICAL MOTOR," which is incorporated by reference herein in its entirety for all purposes.

FIELD

The present disclosure generally relates to the field of aircraft landing gear and, more particularly, to the actuation of aircraft landing gear.

BACKGROUND

Landing gear actuation systems generally utilize hydraulic components that work with a central or a localized hydraulic system. As aircraft become more advanced there is a need for an electric landing gear actuation system that does not use a hydraulic system.

SUMMARY

A landing gear actuation system is disclosed herein. The landing gear actuation system includes a motor; a gearbox comprising a gear train, a linkage mechanism, and a trunnion. The gear train is coupled to the motor. The linkage mechanism is coupled to the gear train. The trunnion is coupled to the linkage mechanism. Rotation of the gear train by the motor rotates the linkage mechanism to drive the trunnion to at least one of extend or retract a landing gear.

In various embodiments, the linkage mechanism comprises a crank link coupled to a connecting rod. In various embodiments, the crank link is further coupled to an output of the gear train. In various embodiments, the connecting rod is further coupled to the trunnion.

In various embodiments, the motor is an electric motor.

In various embodiments, the motor and the gear train are coupled to a structure of an aircraft via a casing. In various embodiments, the casing includes a set of bearings that transfers a load provided by the motor and the gear train to an aircraft landing gear bay structure. In various embodiments, the gear train is a multiple stage epicyclic gear train.

In various embodiments, the gear train amplifies a first torque produced by the motor thereby generating a second torque.

In various embodiments, the linkage mechanism amplifies the second torque produced by the gear train thereby generating a third torque.

In various embodiments, the landing gear actuation system further includes a clutch. In various embodiments, the clutch is coupled between the linkage mechanism and the gear train.

In various embodiments, the clutch is configured to disengage the coupling between the linkage mechanism and the gear train thereby allowing the landing gear to free fall by its payload via gravity in response to an event. In various embodiments, the clutch is controlled via a clutch release mechanism. In various embodiments, the clutch release mechanism is at least one of a manual release lever or an electronic release.

In various embodiments, the event is at least one of a failure of the gear train or a failure of the motor.

In various embodiments, the motor rotates in either a first direction or a second direction, wherein the second direction is opposite the first direction. In various embodiments, the motor is configured to oscillate overcome an eccentric locking mechanism.

Also disclosed herein is an aircraft. The aircraft includes a landing gear and a landing gear actuation system. The landing gear actuation system includes a motor; a gearbox comprising a gear train, a linkage mechanism, and a trunnion. The gear train is coupled to the motor. The linkage mechanism is coupled to the gear train. The trunnion is coupled to the linkage mechanism. Rotation of the gear train by the motor rotates the linkage mechanism to drive the trunnion to at least one of extend or retract a landing gear.

In various embodiments, the linkage mechanism comprises a crank link coupled to a connecting rod. In various embodiments, the crank link is further coupled to an output of the gear train. In various embodiments, the connecting rod is further coupled to the trunnion.

In various embodiments, the motor is an electric motor.

In various embodiments, the motor and the gear train are coupled to a structure of an aircraft via a casing. In various embodiments, the casing includes a set of bearings that transfers a load provided by the motor and the gear train to an aircraft landing gear bay structure. In various embodiments, the gear train is a multiple stage epicyclic gear train.

In various embodiments, the gear train amplifies a first torque produced by the motor thereby generating a second torque.

In various embodiments, the linkage mechanism amplifies the second torque produced by the gear train thereby generating a third torque.

In various embodiments, the landing gear actuation system further includes a clutch. In various embodiments, the clutch is coupled between the linkage mechanism and the gear train.

In various embodiments, the clutch is configured to disengage the coupling between the linkage mechanism and the gear train thereby allowing the landing gear to free fall by its payload via gravity in response to an event. In various embodiments, the clutch is controlled via a clutch release mechanism. In various embodiments, the clutch release mechanism is at least one of a manual release lever or an electronic release.

In various embodiments, the event is at least one of a failure of the gear train or a failure of the motor.

In various embodiments, the motor rotates in either a first direction or a second direction, wherein the second direction is opposite the first direction. In various embodiments, the motor is configured to oscillate overcome an eccentric locking mechanism.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
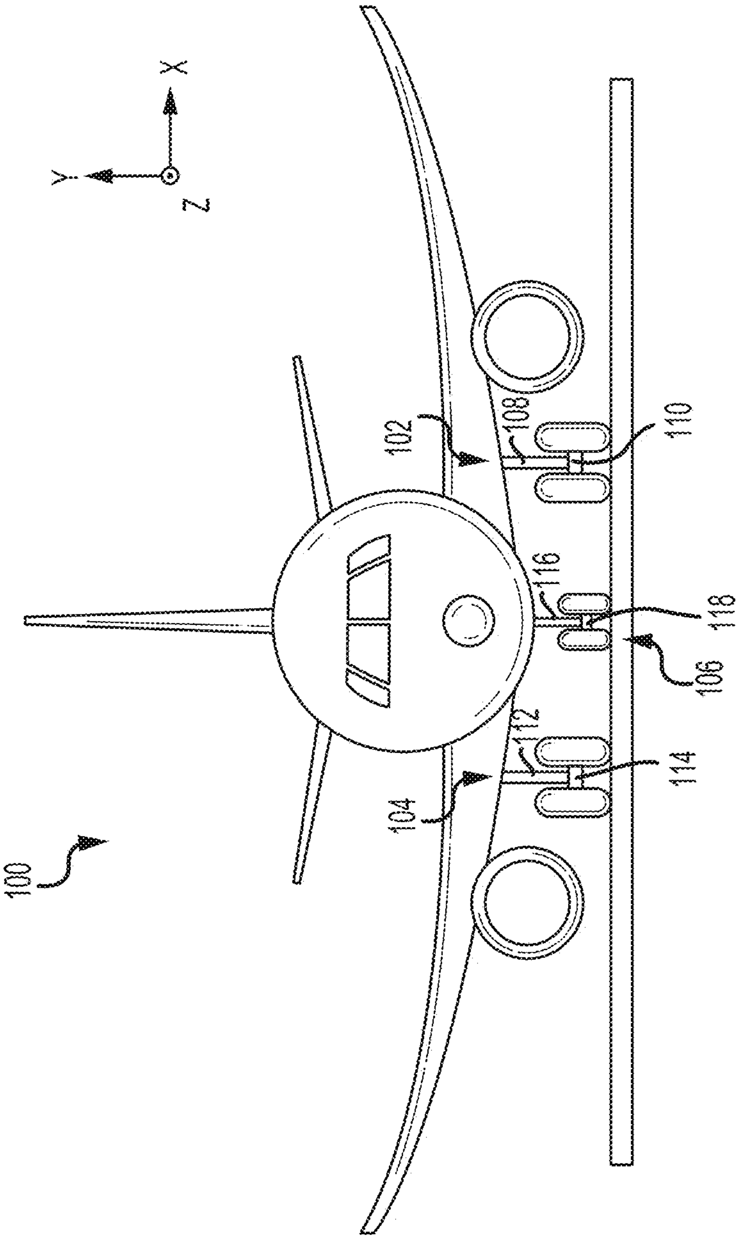
FIG. 1 illustrates an aircraft, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As described previously, a typical landing gear system utilizes a hydraulic actuator for landing gear retraction and extension. However, as aircraft become more advanced there is a need for an electric landing gear actuation system that does not use a hydraulic system. In that regard, typical hydraulic based landing gear systems may be replaced with electric landing gear actuation system.

Disclosed herein is a landing gear retraction and extension system operated by an electric motor driven link mechanism along with a gearbox. In various embodiments, the landing gear retraction and extension system, includes the electric motor, the gearbox configured to be coupled to the electric motor, and a trunnion (retraction/extension link) configured to be coupled to an output shaft of the gearbox via a connecting rod and crank link. In various embodiments, the connecting rod is driven by the crank link. In various embodiments, the crank link rotation is controlled by the electrical motor rotating the gears within the gearbox. In that regard, in various embodiments, the gearbox may include an epicyclic gear train (also known as a planetary gearset) including two or more gears mounted so that a center of one gear (the "planet") revolves around the center of the other gear (the "sun"). In various embodiments, the gearbox may also include a clutch mechanism. In various embodiments, the clutch mechanism is provided for events where a failure occurs, such as electric power loss or gearbox failure, among others, and the landing gear may be extended by its payload, i.e. own weight, via gravity operating on the landing gear. In various embodiments, the clutch mechanism may be controlled via a clutch release mechanism, such as a manual release lever or electronic release, among others, operated by the pilot. In various embodiments, the linkage mechanism, i.e. the connecting rod and crank link driven by the gearbox, provides a mechanical advantage by torque amplification from the electric motor.

Referring now to FIG. 1, in accordance with various embodiments, an aircraft 100 is illustrated. The aircraft 100 may include one or more landing gear, such as, for example, a left landing gear 102 (or port-side landing gear), a right landing gear 104 (or starboard-side landing gear), and a nose landing gear 106. Each of the left landing gear 102, the right landing gear 104, and the nose landing gear 106 may support the aircraft 100 when not flying, allowing the aircraft 100 to taxi, takeoff, and land, safely and without damage to the aircraft. The left landing gear 102 may include a left landing gear assembly 108 that includes a left wheel assembly 110, the right landing gear 104 may include a right landing gear assembly 112 that includes a right wheel assembly 114, and the nose landing gear 106 may include a nose landing gear assembly 116 that includes a nose wheel assembly 118.

Figure 2A:
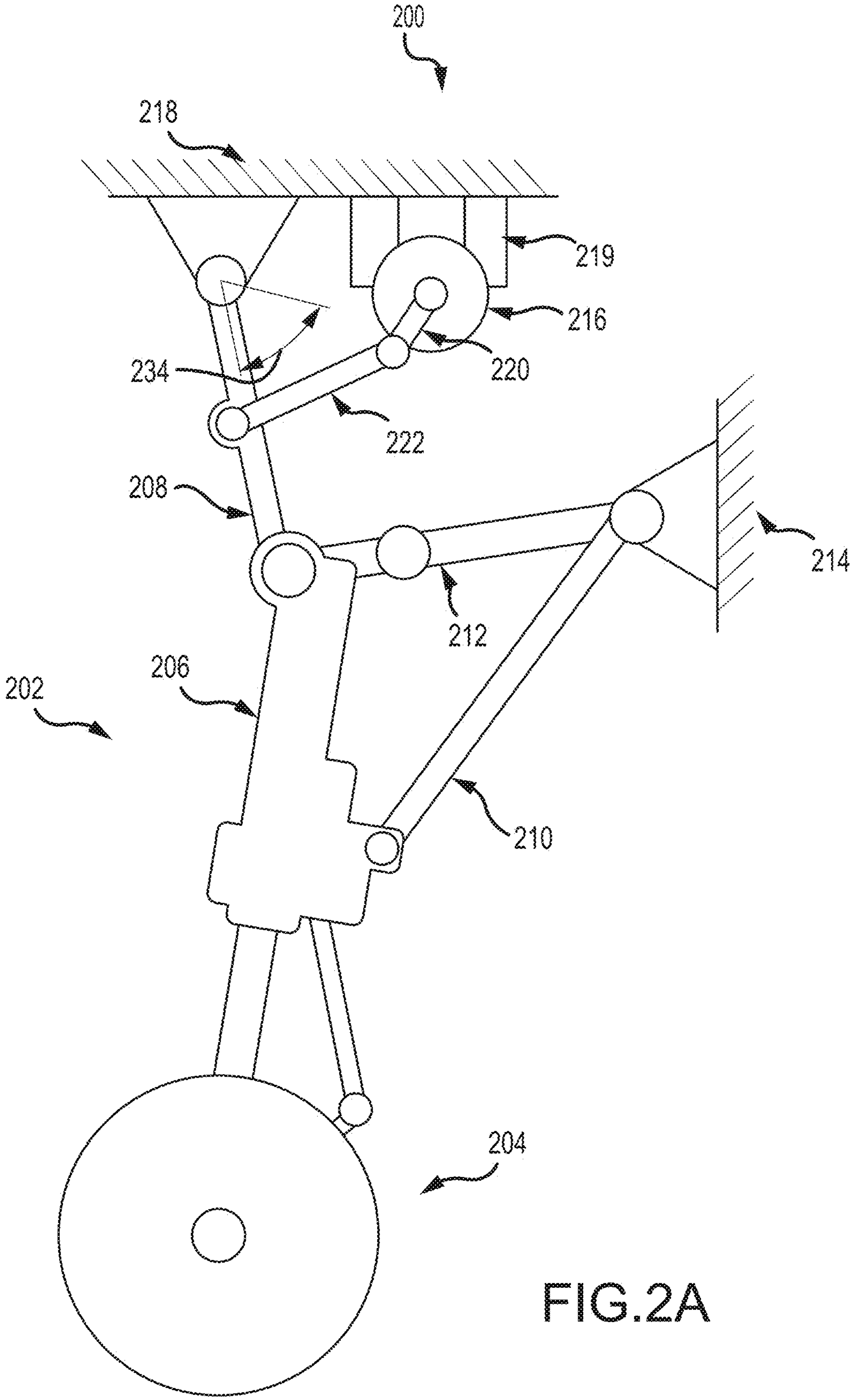
FIGS. 2A and 2B illustrate an exemplary landing gear in an extended and retracted position, respectively accordance with various embodiments.
Figure 2B:
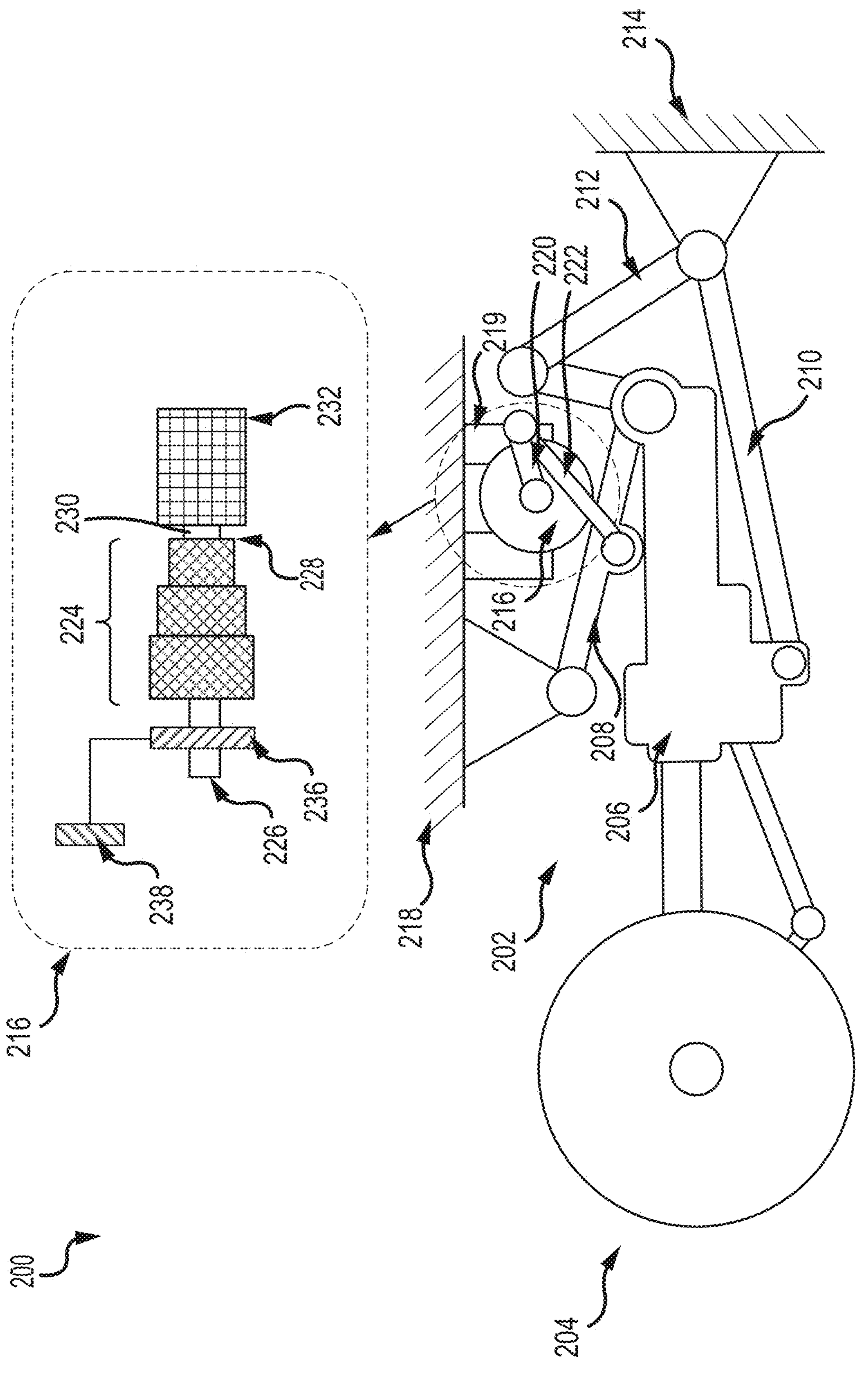

Referring now to FIGS. 2A and 2B, in accordance with various embodiments, a landing gear 200 in an extended and retracted position, respectively, are illustrated. In various embodiments, landing gear 200 may be an example of left landing gear 102, right landing gear 104, or nose landing gear 106 of FIG. 1. In various embodiments, landing gear 200 includes a landing gear assembly 202 and a wheel assembly 204. Landing gear assembly 202 includes a shock strut assembly 206 and a trunnion 208. As illustrated, landing gear assembly 202 rotates about trunnion 208 during extending and retracting procedures. In the fully extended position, as shown in FIG. 2A, shock strut assembly 206 is rotated away from an aircraft body and provides support for the aircraft, to rest against a ground surface, for example. In various embodiments, landing gear assembly 202 further includes other linkages or supports for maintaining the shock strut assembly 206 in the fully extended position, such as drag brace 210 and truss brace assembly 212 that are each configured to be coupled to the shock strut assembly 206 on a first end and configured to be coupled to a first aircraft attachment 214 on a second end opposite the first end.

In various embodiments, an actuation system of landing gear 200 includes an electric motor and gearbox assembly 216 configured to be coupled to a second aircraft attachment 218 via casing 219, a crank link 220 with a first end configured to be coupled to an output of the electric motor and gearbox assembly 216, a connecting rod 222 with a first end configured to be coupled to a second end of the crank link 220, and the trunnion 208. In various embodiments, a second end of the connecting rod 222 is configured to be coupled to the trunnion 208 between the first end and a second end of the trunnion 208. In various embodiments, the combination of the crank link 220 and the connecting rod together may be referred to as a linkage mechanism. In various embodiments, a first end of the trunnion 208 is configured to be coupled to the shock strut assembly 206 and a second end of the trunnion 208 is configured to be coupled to the second aircraft attachment 218. In various embodiments, the gearbox portion of the electric motor and gearbox assembly 216 comprises a gear train 224. In various embodiments, the gear train 224 is an epicyclic gear train that provides torque amplification within a small envelope. In various embodiments, a first end 226, i.e. an output, of the gear train 224 may be configured to be coupled a first end of the crank link 220. In various embodiments, the first end 226, i.e. an output, of the gear train 224 may be configured to be coupled a first end of the crank link 220 via a clutch mechanism 236 that is configured to extend the landing gear 200 during certain events, such as electric power loss or gearbox failure, among others. In various embodiments, the clutch mechanism 236 may be controlled via a clutch release mechanism 238, such as a manual release lever or electronic release, among others, operated by the pilot. In various embodiments, a second end 228 of the gear train 224 is configured to be coupled to a shaft 230 of the electric motor 232. In various embodiments, the torque amplification and speed provided by the electric motor and gearbox assembly 216 ensures a proper retraction/extension angle 234 of the landing gear 200. In various embodiments, the casing 219 that couples the electric motor and gearbox assembly 216 to the second aircraft attachment 218 may include a set of bearings that transfers the load provided by the electric motor and gearbox assembly 216 to an aircraft landing gear bay structure of the second aircraft attachment 218.

Figure 3:
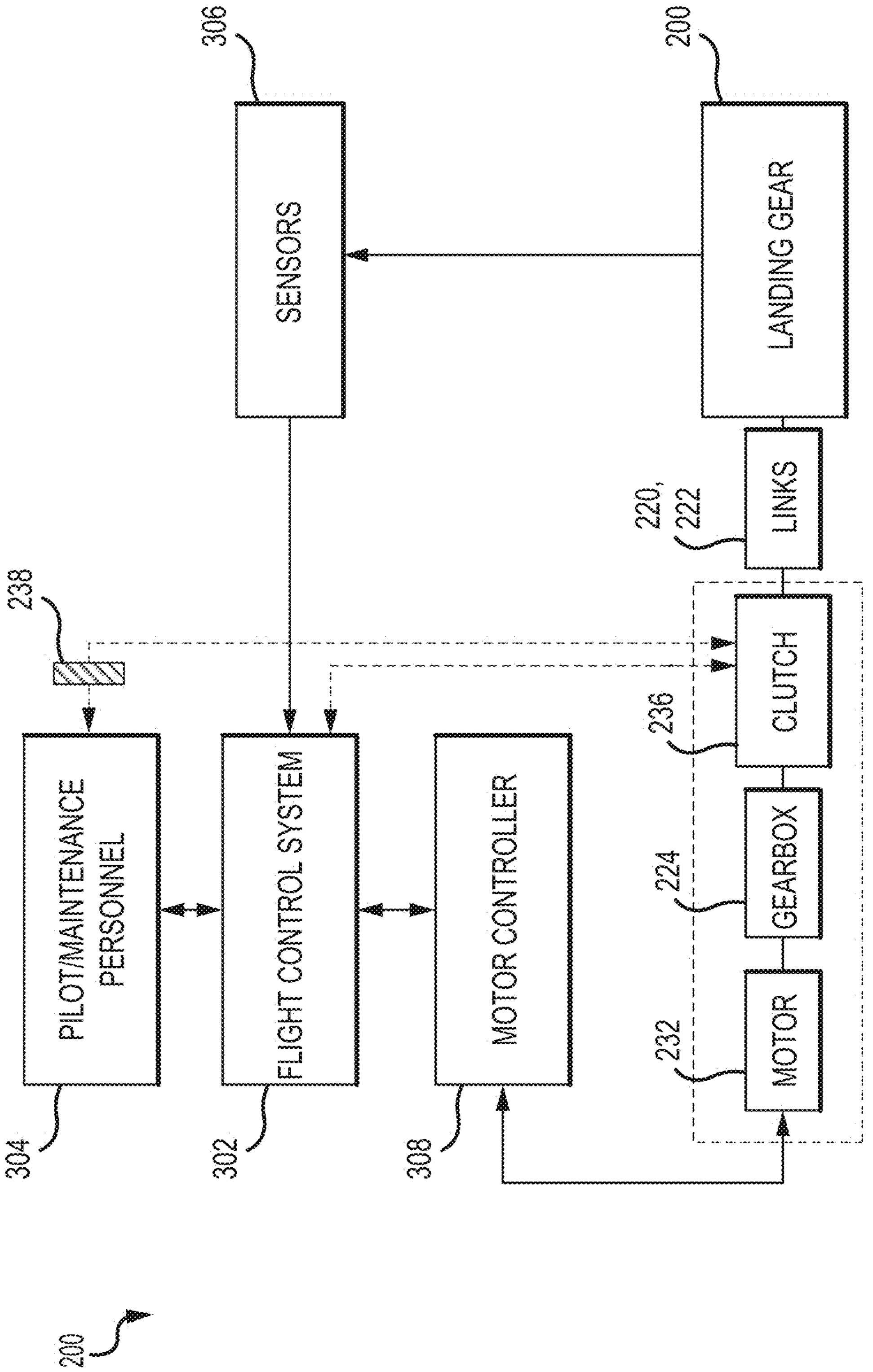
FIG. 3 illustrates a landing gear control system, in accordance with various embodiments.

With additional reference to FIG. 3 that, in accordance with various embodiments, illustrates a landing gear control system 300. In various embodiments, a flight control system (FCS) 302 is configured to receive a command from a pilot or maintenance personnel 304. (extension/retraction). In various embodiments, the FCS 302 is configured to monitor a position of the landing gear 200 via on or more of a plurality of sensors 306. In various embodiments, the plurality of sensors 306 may include at least one of a weight on wheel sensor, a downlock sensor, or an uplock, among others. In various embodiments, responsive to receiving the command, the FCS 302 may send a command to a motor controller 308 to either extend or retract the landing gear 200 based on the command from the pilot or maintenance personnel 304. In various embodiments, based on the command from the FCS 302, the motor controller 308 operates the electric motor 232 in a first direction, i.e. either clockwise or counterclockwise, to extend the landing gear 200 and in a second direction the retract the landing gear 200, the second direction being an opposite of the first direction. In various embodiments, during retraction the landing gear 200 which requires unlocking of the drag brace 210 and/or truss brace assembly 212, a small angle of oscillation may be required to overcome an eccentric locking mechanism, such as an overcenter locking mechanism, which the motor controller 308 may be programmed to allow for such function.

In various embodiments, the electric motor 232 is configured to be coupled to the gear train 224 so that a torque generated by the electric motor 232 is amplified based on the gear ratio of the gears in the gear train 224. In various embodiments, the first end 226 of the gear train 224 may be configured to be coupled directly to the first end of the crank link 220, where the second end of the crank link 220 is configured to be coupled to the first end of the connecting rod 222. In various embodiments, rotation of the gear train 224 by the electric motor 232 rotates the crank link 220 and thus the connecting rod 222, i.e. the linkage mechanism, to drive the trunnion 208 to either extend or retract the landing gear 200. In various embodiments, the first end 226 of the gear train 224 may be configured to be coupled indirectly to the first end of the crank link 220 via a clutch mechanism 238. In various embodiments, the clutch mechanism 238 is configured to be controlled by the pilot via a clutch release mechanism 238 or via a command to the FCS 302, among others, to avoid over travel as well as gearbox and motor failure incidents. In various embodiments, in the event of an incident, under command by the FCS 302 as commanded by the pilot or by the pilot activating a clutch release mechanism 238, the clutch mechanism 236 disengages a coupling of the gear train 224 to the crank link 220 thereby allowing the landing gear 200 to free fall by its payload via gravity. In various embodiments, the torque output by the gear train 224 may be further amplified by the crank link 220 and the connecting rod 222 configuration that provides a mechanical advantage to extend and retract the landing gear 200.

Accordingly, the epicyclic gearbox paired with various linkage mechanisms amplify the torque requirement of the landing gear extension/retraction operation. Additionally, the described electrical motor operated landing gear retraction and extension system provides an alternative to typical hydraulic systems. Furthermore, the introduction of the clutch mechanism between the gearbox and crank link provides redundancy in the event of an incident.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A landing gear actuation system, the landing gear actuation system comprising:
- an electric motor;
- a gearbox comprising an epicyclic gear train coupled to a shaft of the electric motor, the epicyclic gear train configured to amplify a first torque produced by the electric motor thereby generating a second torque;
- a linkage mechanism comprising a crank link and a connecting rod, wherein a first end of the crank link is coupled to an output of the epicyclic gear train, wherein a second end of the crank link is coupled to a first end of the connecting rod, and wherein the linkage mechanism is configured to amplify the second torque produced by the epicyclic gear train thereby generating a third torque; and
- a trunnion coupled to a second end of the connecting rod, wherein a first end of the trunnion is configured to be coupled to a shock strut assembly and a second end of the trunnion is configured to be coupled to an aircraft attachment, wherein rotation of the epicyclic gear train by the electric motor rotates the crank link thereby rotating the connecting rod to drive the trunnion to at least one of extend or retract a landing gear, wherein the second end of the connecting rod is coupled between the first end and second end of the trunnion.

2. The landing gear actuation system of claim 1, wherein the electric motor and the epicyclic gear train are coupled to a structure of an aircraft via a casing and wherein the epicyclic gear train is a multiple stage epicyclic gear train.

3. The landing gear actuation system of claim 1, further comprising:
- a clutch, wherein the clutch is coupled between the crank link and the epicyclic gear train.

4. The landing gear actuation system of claim 3, wherein the clutch is configured to disengage the coupling between the crank link and the epicyclic gear train thereby allowing the landing gear to free fall by its payload via gravity in response to an event, wherein the clutch is controlled via a clutch release mechanism, and wherein the clutch release mechanism is at least one of a manual release lever or an electronic release.

5. The landing gear actuation system of claim 4, wherein the event is at least one of a failure of the epicyclic gear train or a failure of the electric motor.

6. The landing gear actuation system of claim 1, wherein the electric motor rotates in either a first direction or a second direction, wherein the second direction is opposite the first direction, and wherein the electric motor is configured to oscillate to overcome an eccentric locking mechanism.

7. The landing gear actuation system of claim 1, further comprising:
- a flight control system configured to receive a command from at least one of a pilot or maintenance personnel; and
- a motor controller configured to operate the electric motor responsive to the flight control system, wherein the motor controller operates the electric motor in a first direction to extend the landing gear and in a second direction to retract the landing gear, the second direction being opposite the first direction.

8. The landing gear actuation system of claim 7, further comprising a plurality of sensors, wherein the flight control system is configured to monitor a position of the landing gear via the plurality of sensors, and wherein the plurality of sensors comprises at least one of a weight on wheel sensor, a downlock sensor, or an uplock sensor.

9. The landing gear actuation system of claim 1, further comprising:
- a drag brace configured to be coupled to the shock strut assembly on a first end and configured to be coupled to an aircraft structure on a second end; and
- a truss brace assembly configured to be coupled to the shock strut assembly on a first end and configured to be coupled to the aircraft structure on a second end, wherein the drag brace and the truss brace assembly maintain the shock strut assembly in a fully extended position.

10. The landing gear actuation system of claim 3, wherein the clutch is configured to be controlled via a command to a flight control system, wherein responsive to the command the clutch disengages a coupling of the epicyclic gear train to the crank link thereby allowing the landing gear to free fall by its payload via gravity.

11. The landing gear actuation system of claim 6, wherein the eccentric locking mechanism is an overcenter locking mechanism, wherein during retraction of the landing gear a small angle of oscillation of the electric motor is required to overcome the overcenter locking mechanism.

12. An aircraft, the aircraft comprising:
- a landing gear; and
- a landing gear actuation system, the landing gear actuation system comprising:
  - an electric motor;
  - a gearbox comprising an epicyclic gear train coupled to a shaft of the electric motor, the epicyclic gear train configured to amplify a first torque produced by the electric motor thereby generating a second torque;

a linkage mechanism comprising a crank link and a connecting rod, wherein a first end of the crank link is coupled to an output of the epicyclic gear train, wherein a second end of the crank link is coupled to a first end of the connecting rod, and wherein the linkage mechanism is configured to amplify the second torque produced by the epicyclic gear train thereby generating a third torque; and a trunnion coupled to a second end of the connecting rod, wherein a first end of the trunnion is configured to be coupled to a shock strut assembly and a second end of the trunnion is configured to be coupled to an aircraft attachment, wherein rotation of the epicyclic gear train by the electric motor rotates the crank link thereby rotating the connecting rod to drive the trunnion to at least one of extend or retract the landing gear, wherein the second end of the connecting rod is coupled between the first end and second end of the trunnion.

13. The aircraft of claim 12, wherein the electric motor and the epicyclic gear train are coupled to a structure of an aircraft via a casing and wherein the epicyclic gear train is a multiple stage epicyclic gear train.

14. The aircraft of claim 12, further comprising:

a clutch, wherein the clutch is coupled between the crank link and the epicyclic gear train.

15. The aircraft of claim 14, wherein the clutch is configured to disengage the coupling between the crank link and the epicyclic gear train thereby allowing the landing gear to free fall by its payload via gravity in response to an event, wherein the clutch is controlled via a clutch release mechanism, and wherein the clutch release mechanism is at least one of a manual release lever or an electronic release.

16. The aircraft of claim 15, wherein the event is at least one of a failure of the epicyclic gear train or a failure of the electric motor.

17. The aircraft of claim 12, wherein the electric motor rotates in either a first direction or a second direction, wherein the second direction is opposite the first direction, and wherein the electric motor is configured to oscillate to overcome an eccentric locking mechanism.

18. The aircraft of claim 12, further comprising:

a flight control system configured to receive a command from at least one of a pilot or maintenance personnel; and a motor controller configured to operate the electric motor responsive to the flight control system, wherein the motor controller operates the electric motor in a first direction to extend the landing gear and in a second direction to retract the landing gear, the second direction being opposite the first direction.

19. The aircraft of claim 18, further comprising a plurality of sensors, wherein the flight control system is configured to monitor a position of the landing gear via the plurality of sensors, and wherein the plurality of sensors comprises at least one of a weight on wheel sensor, a downlock sensor, or an uplock sensor.

20. The aircraft of claim 14, wherein the clutch is configured to be controlled via a command to a flight control system, wherein responsive to the command the clutch disengages a coupling of the epicyclic gear train to the crank link thereby allowing the landing gear to free fall by its payload via gravity.

* * * * *